US009709187B2

(12) United States Patent
Liu et al.

(10) Patent No.: US 9,709,187 B2
(45) Date of Patent: Jul. 18, 2017

(54) AIR SOURCE CONTROLLING DEVICE FOR A PNEUMATIC NAIL-GUN

(71) Applicant: Basso Industry Corp., Taichung (TW)

(72) Inventors: An-Gi Liu, Taichung (TW); Fu-Yi Huang, Taichung (TW)

(73) Assignee: Basso Industry Corp., Taichung (TW)

( * ) Notice: Subject to any disclaimer, the term of this patent is extended or adjusted under 35 U.S.C. 154(b) by 450 days.

(21) Appl. No.: 14/505,484

(22) Filed: Oct. 2, 2014

(65) Prior Publication Data

US 2015/0097133 A1 Apr. 9, 2015

(30) Foreign Application Priority Data

Oct. 4, 2013 (TW) .............................. 102218676 U

(51) Int. Cl.
*B25C 1/04* (2006.01)
*F16K 31/60* (2006.01)

(52) U.S. Cl.
CPC ............ *F16K 31/602* (2013.01); *B25C 1/043* (2013.01)

(58) Field of Classification Search
CPC ........... B25C 1/043; F16K 31/602; B25F 5/00
See application file for complete search history.

(56) References Cited

U.S. PATENT DOCUMENTS

| | | | | |
|---|---|---|---|---|
| 3,353,453 A * | 11/1967 | Ramspeck | ............... | B25C 1/043 173/169 |
| 3,443,646 A * | 5/1969 | Baker | ..................... | B25B 21/00 173/169 |
| 4,476,942 A * | 10/1984 | Elkin | ........................ | B25F 5/00 173/168 |
| 4,721,166 A * | 1/1988 | Clapp | ................... | B25B 23/145 173/169 |
| 5,205,540 A * | 4/1993 | Clapp | ..................... | B25B 21/00 137/315.35 |
| 5,522,532 A | 6/1996 | Chen | | |
| 5,645,208 A * | 7/1997 | Haytayan | ................ | B25C 1/043 227/130 |

(Continued)

FOREIGN PATENT DOCUMENTS

| | | |
|---|---|---|
| CN | 2344137 Y | 10/1999 |
| CN | 101898348 A | 12/2010 |

(Continued)

*Primary Examiner* — Andrew M Tecco
(74) *Attorney, Agent, or Firm* — CKC & Partners Co., Ltd.

(57) ABSTRACT

An air source controlling device for a pneumatic nail-gun includes a body, a choke valve and a switch. The body includes a controlling chamber for connecting a compressed air source, an air passage for communicating the controlling chamber and the pneumatic nail-gun, a switch channel communicating the air passage and an accommodation space, and an air vent hole communicating the accommodation space and an external environment. The choke valve is disposed in the controlling chamber and is switchable between a communicating status and a non-communicating status for controlling the opening or closing between the controlling chamber and the air passage. The switch includes an actuating member slidably disposed in the switch channel and the accommodation space without covering the air vent hole. A sealing member is disposed on the actuating member and is sealed with the switch channel. The actuating member activates the choke valve.

21 Claims, 4 Drawing Sheets

(56) References Cited

U.S. PATENT DOCUMENTS

| | | | | |
|---|---|---|---|---|
| 5,788,219 A | * | 8/1998 | Nakajima | F16K 31/44 251/228 |
| 5,896,933 A | * | 4/1999 | White | B25C 1/043 227/130 |
| 6,886,729 B1 | | 5/2005 | Lee | |
| 6,932,165 B1 | * | 8/2005 | Sun | B25C 1/043 173/168 |
| 7,036,795 B2 | * | 5/2006 | Izumisawa | B25F 5/00 173/169 |
| 7,308,995 B2 | * | 12/2007 | Uchiyama | B25C 1/043 227/130 |
| 7,445,055 B2 | * | 11/2008 | Pusateri | B25F 5/00 173/169 |
| 8,499,852 B2 | * | 8/2013 | Chen | B25F 5/00 173/169 |
| 9,296,094 B2 | * | 3/2016 | Su | B25B 21/00 |
| 2002/0043386 A1 | | 4/2002 | Fujiyama | |
| 2002/0125021 A1 | * | 9/2002 | Tseng | B25C 1/043 173/169 |
| 2008/0047721 A1 | * | 2/2008 | Chen | B25F 5/00 173/15 |
| 2012/0160889 A1 | * | 6/2012 | Tanji | B25C 1/047 227/142 |
| 2013/0228606 A1 | | 9/2013 | Staples et al. | |
| 2014/0190719 A1 | * | 7/2014 | Ting | B25F 5/00 173/221 |

FOREIGN PATENT DOCUMENTS

| | | |
|---|---|---|
| CN | 101973023 A | 2/2011 |
| CN | 102398253 A | 4/2012 |
| CN | 103085033 A | 5/2013 |
| JP | 2001162555 A | 6/2001 |
| TW | 588686 U | 5/2004 |
| TW | 201119806 A | 6/2011 |
| TW | I352652 B | 11/2011 |

* cited by examiner

AIR SOURCE CONTROLLING DEVICE FOR A PNEUMATIC NAIL-GUN

RELATED APPLICATIONS

This application claims priority to Taiwan Application Serial Number 102218676, filed Oct. 4, 2013, which is herein incorporated by reference.

BACKGROUND

Technical Field

The present disclosure relates to a pneumatic nail-gun. More particularly, the present disclosure relates to an air source controlling device for the pneumatic nail-gun. High-pressure air of a compressed air source can be directly passed into the pneumatic nail-gun through the air source controlling device, and a trigger actuates the air source controlling device according to the levering principle. Therefore, it is easy to use and breakdown can be reduced.

Description of Related Art

A pneumatic nail-gun is an indispensable tool in upholstery and carpentry. The pneumatic nail-gun firing nails by a high-pressure air produced by an air compressor. However, the pneumatic nail-gun has a certain degree of lethality, if a user inadvertently actives the trigger owing to careless operation, the pneumatic nail-gun would injure the user or any staff around the user.

The patent No. TW I352652 discloses a safety device of a pneumatic nail-gun. An auxiliary handle is disposed on a side of the pneumatic nail-gun for connecting an outer air compressor and an inner portion of the pneumatic nail-gun. The auxiliary handle has a control device for controlling whether the air of the air compressor passes into the pneumatic nail-gun or not, thereby the pneumatic nail-gun is at a cocked state. In order to fire the nail, a user must actuate a switch of the control device on the auxiliary handle by one hand and actuate the trigger by the other hand. Therefore, accidental firing the nail can be prevented when the user accidentally actuates the trigger, and a higher security can be achieved.

However, the switch of the control device in the above patent is radial type. In order to active the trigger, the user should actuate a plate from bottom to top to abut the plate against an end of a valve. Without applying the levering principle, the operation of the trigger has larger resistance and is inconsistent with Ergonomic. Moreover, the high-pressure air passes into the pneumatic nail-gun through the holes on the first ring and the second ring, therefore the pneumatic nail-gun has not only a rugged air passage but also a small cross-sectional area for air inlet. Therefore, supplying of the high-pressure air into the pneumatic nail-gun may be insufficient during continuous operation.

Moreover, in another type of pneumatic nail-gun, a double insurance mechanism is used by coupling an auxiliary handle with a safety device of the pneumatic nail-gun. During a continuous operation, this kind of pneumatic nail-gun uses the same compressed air source used for firing nail and actuating the double insurance mechanism. Therefore, the compressed air is dispersed, and insufficient supply of the high pressure air may also be occurred.

SUMMARY

According to one aspect of the present disclosure, the present disclosure provides an air source controlling device for a pneumatic nail-gun. The air source controlling device includes a body, a choke valve and a switch. The body includes a controlling chamber located therein for connecting a compressed air source, an air passage for communicating the controlling chamber and an internal portion of the pneumatic nail-gun, a switch channel communicating the air passage and an accommodation space, and an air vent hole communicating the accommodation space and an external environment. The choke valve is disposed in the controlling chamber and the choke valve is switchable between a communicating status and a non-communicating status for controlling the opening or closing between the controlling chamber and the air passage. The switch includes an actuating member slidably disposed in the switch channel and the accommodation space without covering the air vent hole. A sealing member is disposed on an external surface of the actuating member and tightly is fitted with an internal surface of the switch channel. The actuating member activates the choke valve. Wherein when the actuating member is moved from the accommodation space to the switch channel for activating the choke valve to the communicating status, the sealing member is sealed with an internal surface of the switch channel. Otherwise, when the actuating member is moved to the accommodation space for activating the choke valve to the non-communicating status, the sealing member is located in the accommodation space.

BRIEF DESCRIPTION OF THE DRAWINGS

The present disclosure can be more fully understood by reading the following detailed description, with reference made to the accompanying drawings as follows.

DETAILED DESCRIPTION

The present disclosure provides an air source controlling device for a pneumatic nail-gun; high-pressure air of a compressed air source directly passes into the pneumatic nail-gun through the air source controlling device, and prevents the pneumatic nail-gun from insufficient supply of the high-pressure air.

Figure 1:
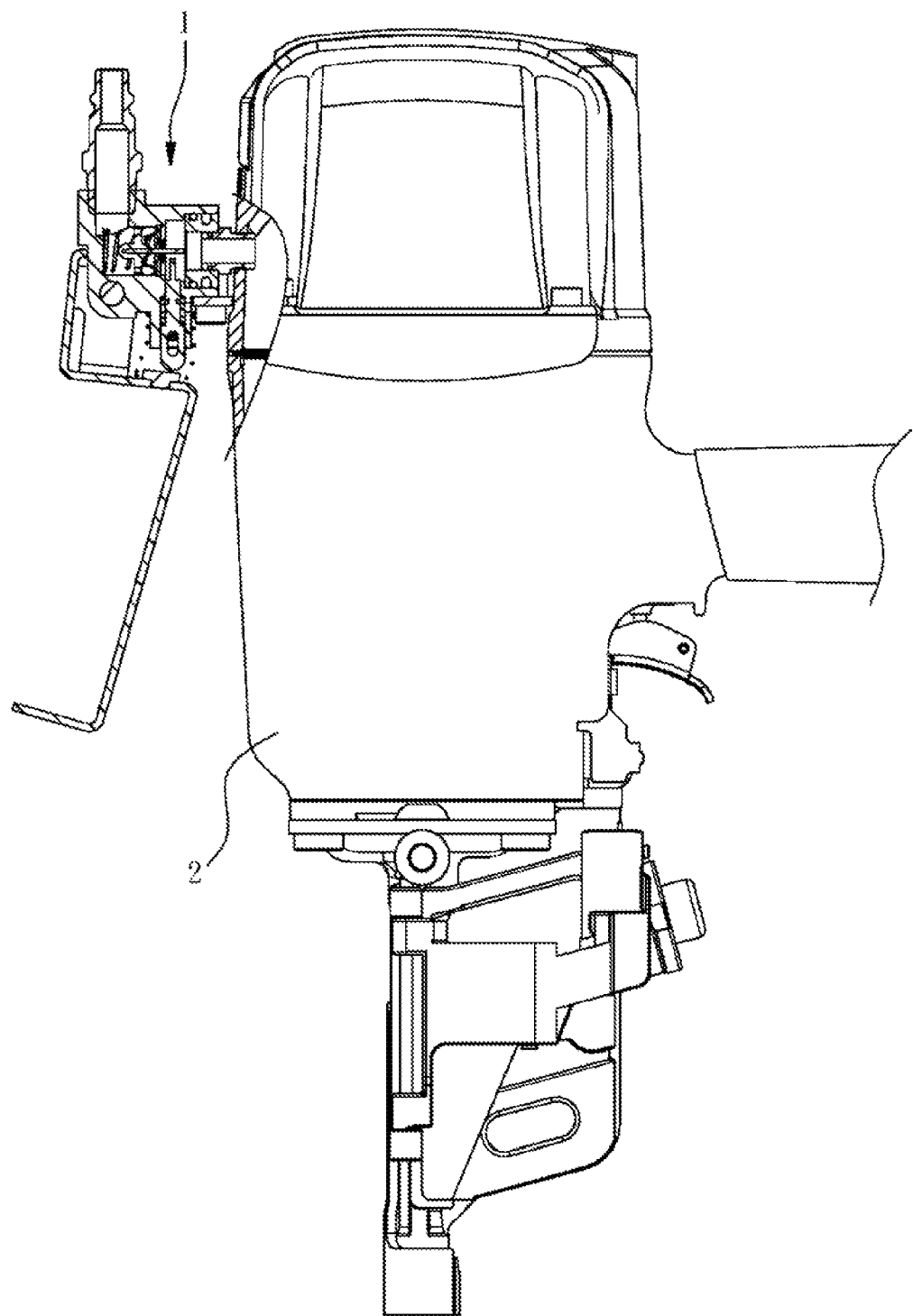
FIG. 1 is a cross-sectional view of a pneumatic nail-gun, showing a air source controlling device according to one embodiment of the present disclosure.
Figure 2:
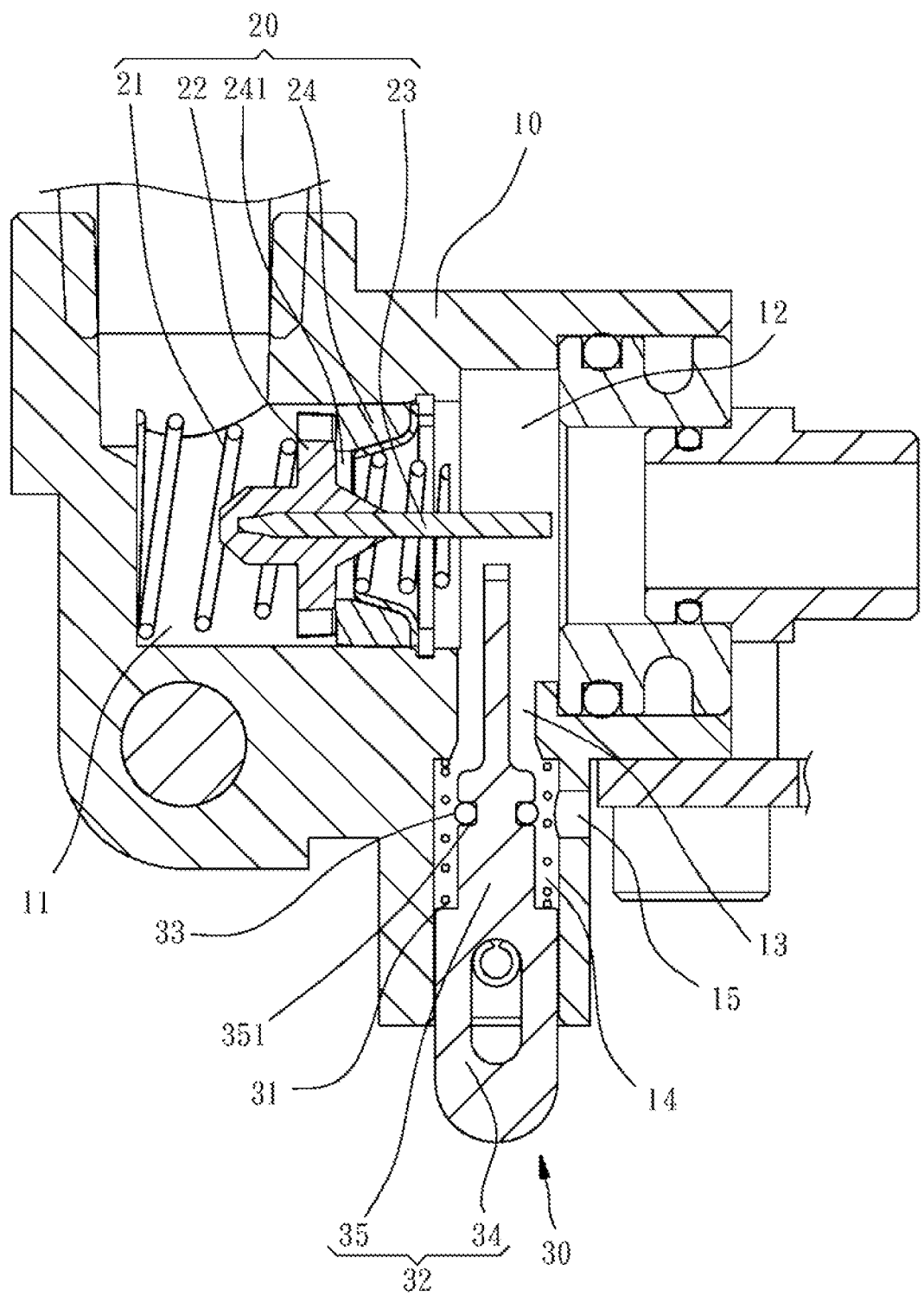
FIG. 2 is a partial cross-sectional view of the air source controlling device according to one embodiment of the present disclosure.
Figure 3:
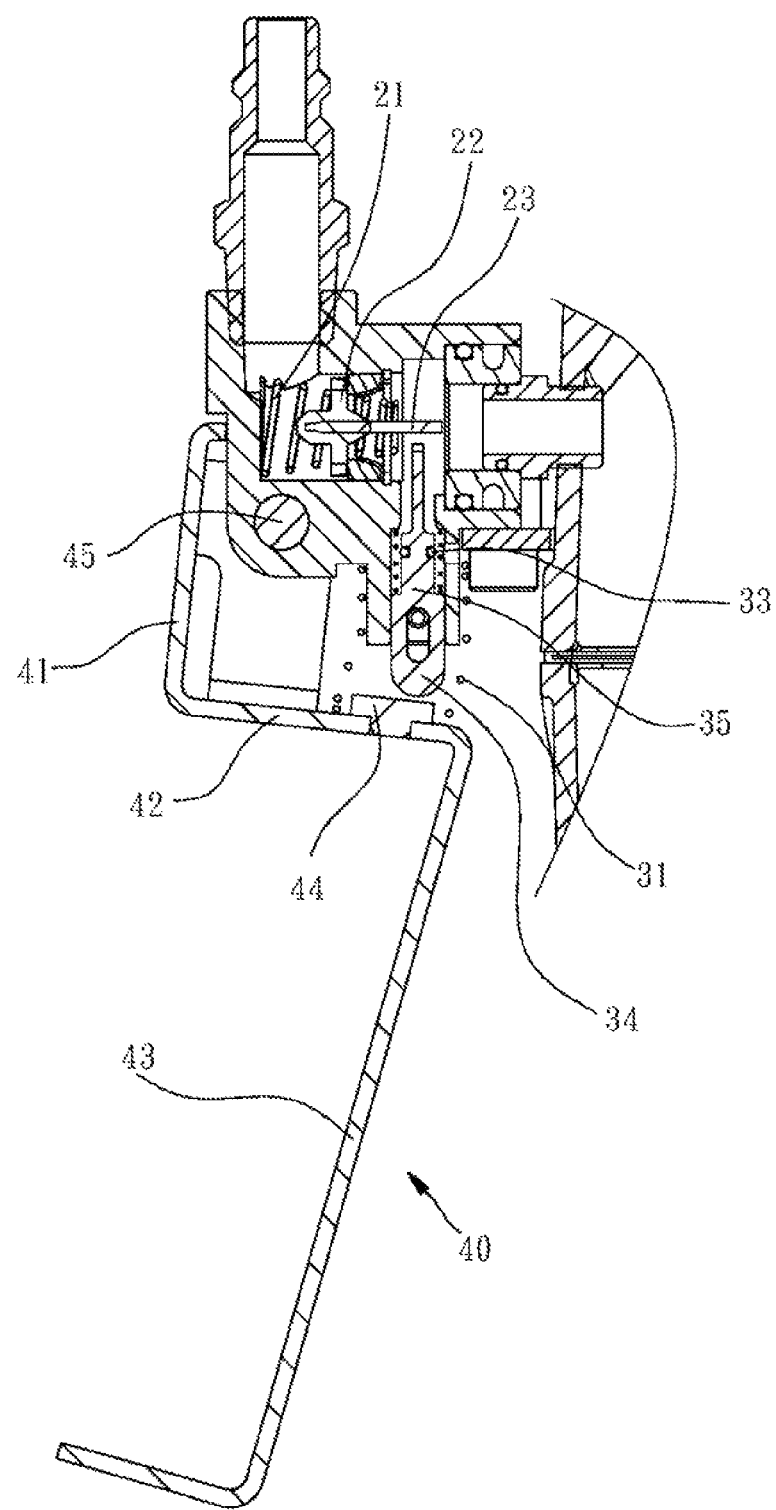
FIG. 3 is a cross-sectional view of the air source controlling device, showing that a chock valve at a non-communicating status according to one embodiment of the present disclosure.
Figure 4:
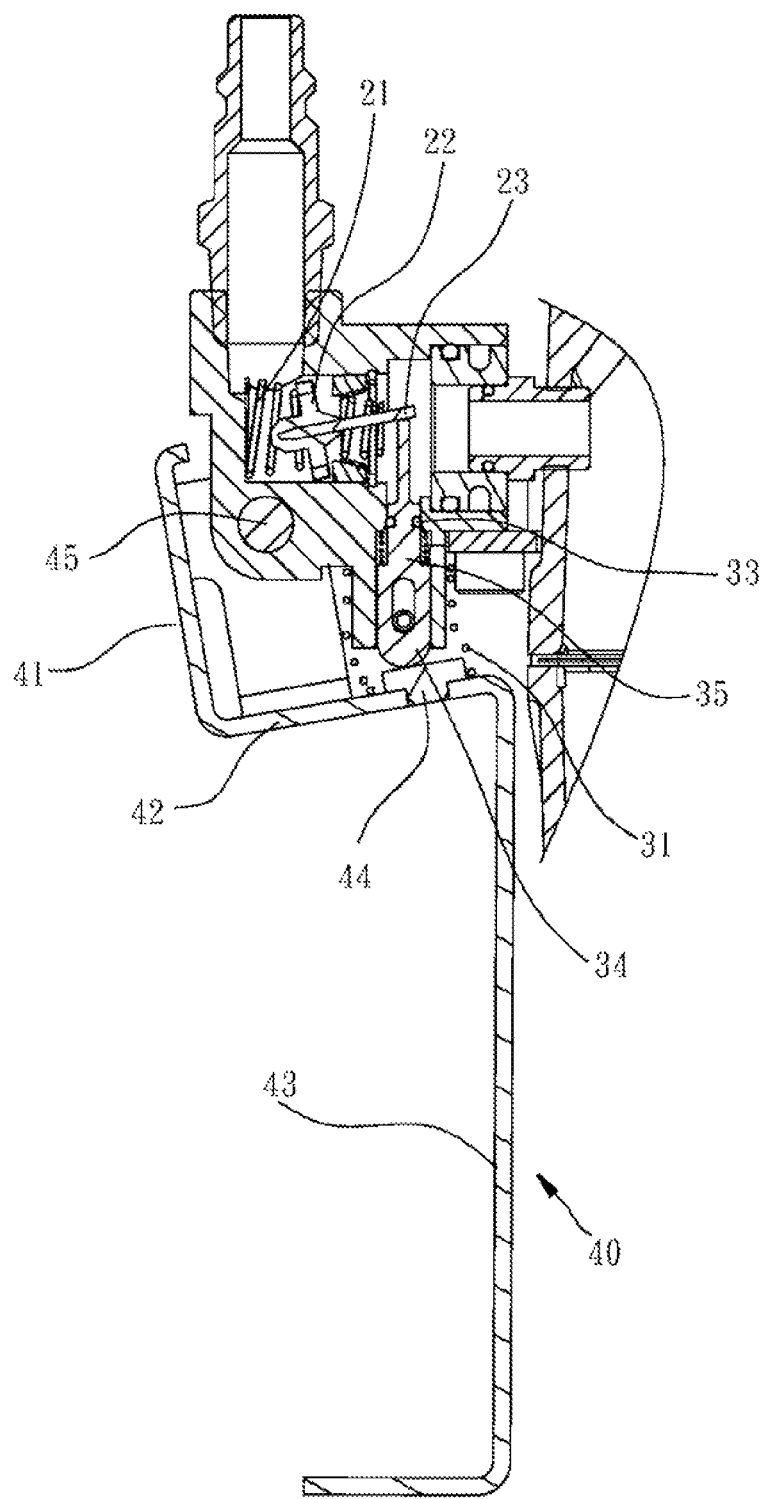
FIG. 4 is a cross-sectional view of the air source controlling device, showing that a chock valve at a communicating status according to one embodiment of the present disclosure.

FIG. 1 is a cross-sectional view of a pneumatic nail-gun, showing an air source controlling device according to one embodiment of the present disclosure. FIG. 2 is a partial cross-sectional view of the air source controlling device according to one embodiment of the present disclosure. FIG. 3 is a cross-sectional view of the air source controlling device, showing that a chock valve at, a non-communicating status according to one embodiment of the present disclosure. FIG. 4 is a cross-sectional view of the air source controlling device, showing that a chock valve at a communicating status according to one embodiment of the present disclosure.

An air source controlling device 1 for a pneumatic nail-gun includes a body 10, a choke valve 20 and a switch 30. The pneumatic nail-gun includes a gun body 2. The body 10 is disposed on the gun body 2 opposite a handle of the pneumatic nail-gun. The body 10 includes a controlling chamber 11, a air passage 12, a switch channel 13, an accommodation space 14 and an air vent hole 15. A top side of the controlling chamber 11 connects a compressed air source (for example, an air compressor, not shown), and the controlling chamber 11 communicates the air passage 12 and towards the gun body 2. The air passage 12 communicates an internal portion of the gun body 2, and also communicates the switch channel 13. The switch channel 13 communicates the accommodation space 14. The air vent hole 15 communicates the accommodation space 14 and an external environment outside of the body 10.

The choke valve 20 is disposed in the controlling chamber 11. The choke valve 20 includes a first elastic member 21, a plate 22, a rod 23 and a stop member 24. The stop member 24 connects to an internal wall of the controlling chamber 11 and has an air inlet hole 241. The air in the controlling chamber 11 passes into the air passage 12 through the air inlet hole 241. Two ends of the first elastic member 21 pass through the air inlet hole 241 and individually abut against the internal walls of the controlling chamber 11. The plate 22 covers the air inlet hole 241 and interposes in the middle of the first elastic member 21, a left surface of the plate 22 abuts against the first elastic member 21, and a right surface of the plate 22 connects the rod 23 and covers the air inlet hole 241. The rod 23 is passed through the air inlet hole 241 and is extended into the air passage 12. The first elastic member 21 is used to provide an elastic force for automatically recovering the choke valve 20 from a communicating status (as shown in FIG. 4) to a non-communicating status (as shown in FIG. 3).

The switch 30 includes a second elastic member 31, an actuating member 32 and a sealing member 33. The actuating member 32 is slidably disposed in the switch channel 13 and the accommodation space 14 without covering the air vent hole 15. According to the example, the sealing member 33 is an O-ring, and the actuating member 32 includes a large diameter portion 34 and a small diameter portion 35. The large diameter portion 34 is slidably disposed in the accommodation space 14 and the small diameter portion 35 is slidably disposed in the switch channel 13. An external surface of the small diameter portion 35 is indented to form a groove 351 and the sealing member 33 is embedded in the groove 351, and the sealing member 33 slightly bulges to the small diameter portion 35. Two ends of the second elastic member 31 individually abut against an internal wall of the accommodation space 14 adjacent to the switch channel 13 and one end of the large diameter portion 34 that towards the small diameter portion 35. Therefore, when the large diameter portion 34 compresses the second elastic member 31, the small diameter portion 35 slides to the choke valve 20 and actuates the rod 23 of the choke valve 20.

For operating the pneumatic nail-gun, when a user applies forces on the switch 30, the large diameter portion 34 moves upward and compresses the second elastic member 31, the small diameter portion 35 gradually bulges upward and seals the switch channel 13 and abuts against the rod 23. The rod 23 is actuated by the small diameter portion 35 and is swung in a counterclockwise direction to drive the plate 22 compress the first elastic member 21, therefore one side of the plate 22 is distanced far from the air inlet hole 241 and the choke valve 20 is switched to the communicating status as shown in FIG. 4. At the communicating status, the high pressure air of the compressed air source passing from the controlling chamber 11, through the plate 22 and the stop member 24, and into the internal portion of the gun body 2 via the air passage 12 is used as a power for firing the nail. At the same moment, the sealing member 33 is located in the switch channel 13, and the small diameter portion 35 prevents air leakage by blocking the air into the accommodation space 14 by sealing the sealing member 35 and an internal surface of the switch channel 13.

When the user stops pressing the large diameter portion 34, the second elastic member 31 applies forces to the large diameter portion 34 and drives the actuating member 32 move downward, therefore the small diameter portion 32 stops actuates the rod 23. At this moment, the plate 22 covers the air inlet hole 241 by the elastic force generated from the first elastic member 21 and the choke valve 20 is switched to the non-communicating status to block the high pressure air of the compressed air source. In addition, the sealing member 33 on the small diameter portion 35 returns into the accommodation space 14 and drives the high pressure air remaining in the gun body 2 pass into the switch channel 13 via the air passage 12. Finally, the high pressure air passes through the air vent hole 15, and to the external environment outside of the body 10 for depressurization.

In the conventional pneumatic nail-gun, the high pressure air of the compressed air source must pass through at last two holes for entering the internal portion of the pneumatic nail-gun. In contrast, in the air source controlling device 1 of the present disclosure, the user just need to press the large diameter portion 34 for driving the small diameter portion 35 actuate the rod 23, and the high pressure air of the compressed air source can directly pass the plate 22 and the stop member 24 and into the air inlet hole 241. Thus, the air source controlling device 1 of the present disclosure not only has a smooth and direct air passage, but also has a greater cross-sectional area for air inlet. Therefore, the pneumatic nail-gun with the air source controlling device 1 of the present disclosure can be prevent from insufficient supply of the high-pressure air even in a continuous and long-time operation.

In FIG. 3, in order to easily press the large diameter portion 34 to actuate the choke valve 20, a trigger 40 is used. The trigger 40 includes a first flat portion 41, a plate portion 42 and a second flat portion 43. The first flat portion 41 pivotally connects the body 10 by a pivot pin 45 and can swing toward the gun body 2. Two sides of the plate portion 42 individually connect the first flat portion 41 and the second flat portion 43. The second flat portion 43 is relatively distanced far from the first flat portion 41, and a longitudinal length of the second flat portion 43 is greater than a longitudinal length of the first flat portion 41. In one example, the large diameter portion 34 is bulged out the accommodation space 14, and the plate portion 42 further connects a pushing member 44. When the user toggles the plate portion 42 to swing the trigger toward the body 10, the pushing member 44 on the plate portion 42 pushes the large diameter portion 34.

Owing to the longitudinal length of the second flat portion 43 is greater than the longitudinal length of the first flat portion 41, when the user toggles the second flat portion 43, the trigger 40 has a smaller resistance due to a greater lever arm. Therefore the trigger can be easily toggled and is consistent with Ergonomic.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An air source controlling device for a pneumatic nail-gun, comprising:
a body comprising a controlling chamber located therein for connecting a compressed air source, an air passage for communicating the controlling chamber and an internal portion of the pneumatic nail-gun, a switch channel communicating the air passage and an accommodation space, and an air vent hole communicating the accommodation space and an external environment;
a choke valve disposed in the controlling chamber, the choke valve being switchable between a communicating status and a non-communicating status for controlling the opening or closing between the controlling chamber and the air passage; and
a switch comprising an actuating member slidably disposed in the switch channel and the accommodation space without covering the air vent hole, a sealing member being disposed on an external surface of the actuating member and being sealed with an internal surface of the switch channel, the actuating member activating the choke valve;
wherein when the actuating member is moved from the accommodation space to the switch channel for activating the choke valve to the communicating status, the sealing member is sealed with the internal surface of the switch channel; otherwise, when the actuating member is moved to the accommodation space for activating the choke valve to the non-communicating status, the sealing member is located in the accommodation space.

2. The air source controlling device of claim 1, wherein the choke valve further comprises: a stop member connected to the controlling chamber and having an air inlet hole, a plate covering the air inlet hole, a rod that one end thereof being connected to the plate and the other end thereof being passed through the air inlet hole and being extended into the air passage, and a first elastic member providing an elastic force for driving the plate to move to the air inlet hole.

3. The air source controlling device of claim 2, wherein the actuating member comprises a large diameter portion and a small diameter portion, the small diameter portion is located in the switch channel, the large diameter portion is located in the accommodation space, and the small diameter portion actuates the choke valve.

4. The air source controlling device of 3, wherein an external surface of the small diameter portion is indented to form a groove and the sealing member is embedded in the groove.

5. The air source controlling device of claim 4, wherein the sealing member is an O-ring.

6. The air source controlling device of claim 3, further comprising a trigger to actuate the switch, wherein the trigger is swung toward the pneumatic nail-gun.

7. The air source controlling device of claim 6, wherein the trigger comprises a first flat portion, a plate portion and a second flat portion, one end of the first flat portion pivotally is connected to the body and the other end of the first portion is connected to the plate portion, the second flat portion is connected to the plate portion and is relatively distanced far from the first flat portion, and the large diameter portion is bulged out the accommodation space to be pressed by the plate portion.

8. The air source controlling device of claim 7, wherein a longitudinal length of the second flat portion is greater than a longitudinal length of the first flat portion.

9. The air source controlling device of claim 2, wherein the switch further comprises a second elastic member located in the accommodation space for providing an elastic force for driving the actuating member to leave from the switch channel.

10. The air source controlling device of claim 9, wherein the actuating member comprises a large diameter portion and a small diameter portion, the small diameter portion is located in the switch channel, the large diameter portion is located in the accommodation space, and the small diameter portion actuates the choke valve.

11. The air source controlling device of claim 10, wherein an external surface of the small diameter portion is indented to form a groove and the sealing member is embedded in the groove.

12. The air source controlling device of claim 11, wherein the sealing member is an O-ring.

13. The air source controlling device of claim 10, further comprising a trigger to actuate the switch, wherein the trigger is swung toward the pneumatic nail-gun.

14. The air source controlling device of claim 13, wherein the trigger comprises a first flat portion, a plate portion and a second flat portion, one end of the first flat portion is pivotally connected to the body and the other end of the first portion is connected to the plate portion, the second flat portion is connected to the plate portion and is relatively distanced far from the first flat portion, and the large diameter portion is bulged out the accommodation space to be pressed by the plate portion.

15. The air source controlling device of claim 14, wherein a longitudinal length of the second flat portion is greater than a longitudinal length of the first flat portion.

16. The air source controlling device of claim 1, wherein the actuating member comprises large diameter portion and a small diameter portion, the small diameter portion is located in the switch channel, the large diameter portion is located in the accommodation space, and the small diameter portion actuates the choke valve.

17. The air source controlling device of claim 16, wherein an external surface of the small diameter portion is indented to form a groove and the sealing member is embedded in the groove.

18. The air source controlling device of claim 17, wherein the sealing member is an O-ring.

19. The air source controlling device of claim 16, further comprising a trigger to actuate the switch, wherein the trigger is swung toward the pneumatic nail-gun.

20. The air source controlling device of claim 19, wherein the trigger comprises a first flat portion, a plate portion and a second flat portion, one end of the first flat portion is pivotally connected to the body and the other end of the first portion is connected to the plate portion, the second flat portion is connected to the plate portion and is relatively distanced far from the first flat portion, and the large diameter portion is bulged out the accommodation space to be pressed by the plate portion.

21. The air source controlling device of claim 20, wherein a longitudinal length of the second flat portion is greater than a longitudinal length of the first flat portion.

* * * * *